US012769907B2

(12) United States Patent
Hummelshøj

(10) Patent No.: US 12,769,907 B2
(45) Date of Patent: Oct. 20, 2026

(54) ENERGY BASED MODELING (EBM) FOR GROUND STATE INFERENCE

(71) Applicant: TOYOTA RESEARCH INSTITUTE, INC., Los Altos, CA (US)

(72) Inventor: Jens Strabo Hummelshøj, Brisbane, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1093 days.

(21) Appl. No.: 17/894,954

(22) Filed: Aug. 24, 2022

(65) Prior Publication Data

US 2024/0070351 A1 Feb. 29, 2024

(51) Int. Cl.
*G06F 30/27* (2020.01)
*G06F 17/10* (2006.01)
*G06F 119/06* (2020.01)

(52) U.S. Cl.
CPC .............. *G06F 30/27* (2020.01); *G06F 17/10* (2013.01); *G06F 2119/06* (2020.01)

(58) Field of Classification Search
CPC ...... G06F 30/27; G06F 17/10; G06F 2119/06; G06F 30/20
See application file for complete search history.

(56) References Cited

U.S. PATENT DOCUMENTS

| | | | | |
|---|---|---|---|---|
| 2020/0401876 | A1* | 12/2020 | Chakrabartty | G06N 3/08 |
| 2021/0256351 | A1* | 8/2021 | Cao | G06N 10/20 |
| 2022/0068824 | A1* | 3/2022 | Yoo | C22C 29/14 |
| 2023/0359929 | A1* | 11/2023 | Shmilovich | G16C 20/30 |

OTHER PUBLICATIONS

Verdon, et al., "Quantum Hamiltonian-Based Models & the Variational Quantum Thermalizer Algorithm", arXiv:1910.02071 (2019).
Zheng, et al., "Unsupervised Learning of Latent Physical Properties Using Perception-Prediction Networks", arXiv:1807.09244v2 (2020).
Pang, et al., "Learning Latent Space Energy-Based Prior Model for Molecule Generation", arXiv:2010.09351 (2020).
Christopher Aicher, "Scalable Learning in Latent Space Sequence Models", Ph.D. Dissertation, University of Washington (2020).
Pang, et al, "Semi-supervised Learning by Latent Space Energy-Based Model of Symbol-Vector Coupling", arXiv:2010.09359 (2020).
Pang, et al, "Learning Latent Space Energy-Based Prior Model", 34th Conference on Neural Information Processing Systems (2020).

* cited by examiner

*Primary Examiner* — Kibrom K Gebresilassie
(74) *Attorney, Agent, or Firm* — SEYFARTH SHAW LLP

(57) ABSTRACT

A method for ground state inference is described. The method includes modeling a material state of a selected material. The method also includes inferring an energy function and a ground state of the selected material according to the modeling of the material state. The method further includes predicting a different material state of the selected material in response to the inferring of the ground state of the material.

17 Claims, 7 Drawing Sheets

ENERGY BASED MODELING (EBM) FOR GROUND STATE INFERENCE

TECHNICAL FIELD

Certain aspects of the present disclosure generally relate to artificial neural networks and, more particularly, to energy based modeling (EBM) for ground state inference.

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

Machine learning may be used to perform both materials discovery and predict properties of the materials faster than molecular simulations. Machine learning can help identify correlations between material features and target properties. Nevertheless, a solution to the problem of materials property prediction and latent state learning in the case of materials for which certain aspects of state can be assumed as being in a ground state, is desired.

SUMMARY

A method for ground state inference is described. The method includes modeling a material state of a selected material. The method also includes inferring an energy function and a ground state of the selected material according to the modeling of the material state. The method further includes predicting a different material state of the selected material in response to the inferring of the ground state of the material.

A non-transitory computer-readable medium having program code recorded thereon for ground state inference is described. The program code is executed by a processor. The non-transitory computer-readable medium includes program code to model a material state of a selected material. The non-transitory computer-readable medium also includes program code to infer an energy function and a ground state of the selected material according to the modeling of the material state. The non-transitory computer-readable medium further includes program code to predict a different material state of the selected material in response to the inferring of the ground state of the material.

A system for ground state inference is described. The system includes an energy based model (EBM). The EBM models a material state of a selected material. The EBM also infers an energy function and a ground state of the selected material according to the modeling of the material state. The EBM further predicts a different material state of the selected material in response to the inferring of the ground state of the material.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
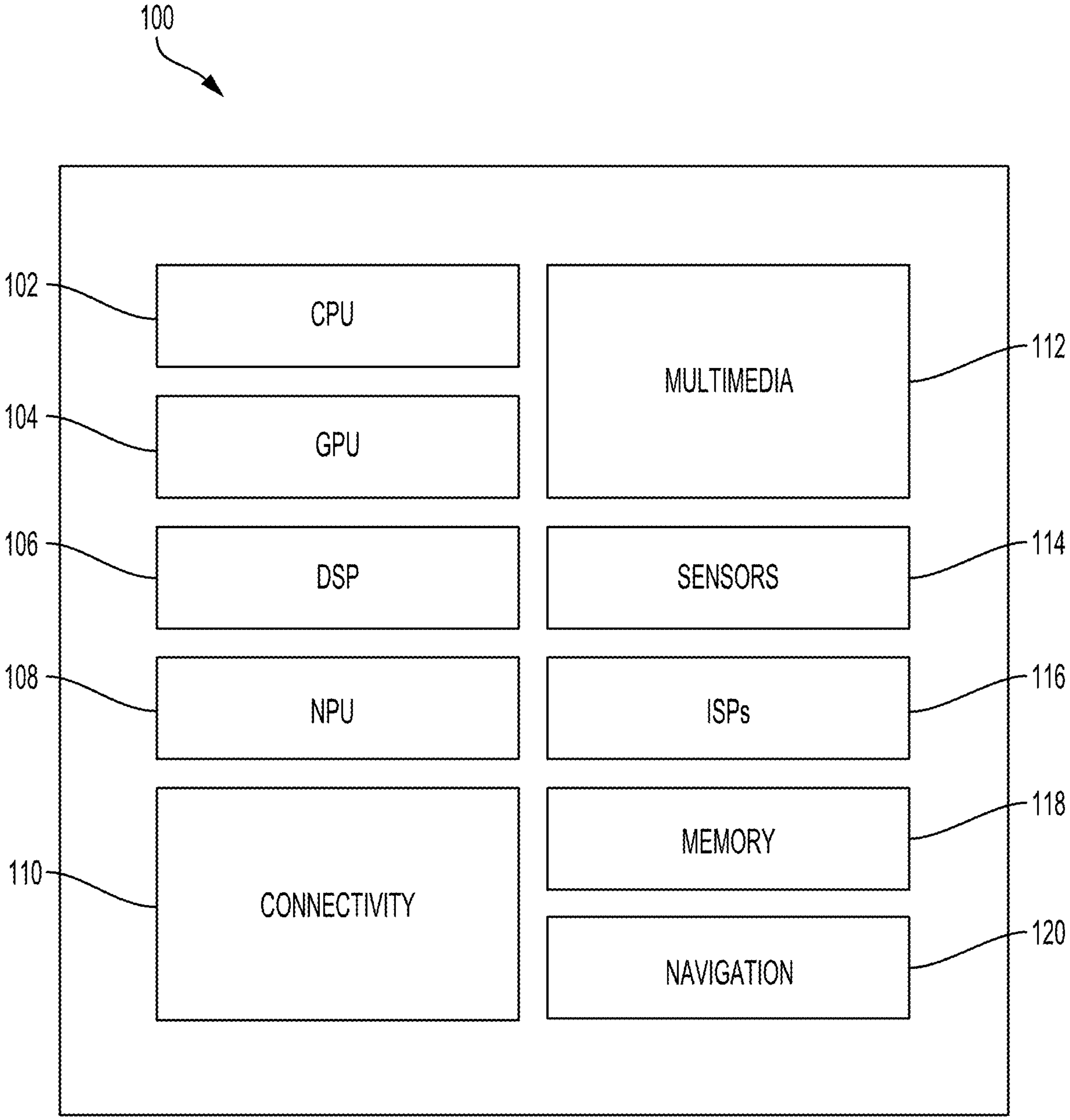
FIG. 1 illustrates an example implementation of designing a neural network using a system-on-chip (SoC), including a general purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

Although particular aspects are described, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

Machine learning is concerned with the automatic discovery of patterns in data through the use of computer algorithms. Once discovered, these patterns may be used to perform data classification and/or value prediction. With growing experimental and simulated dataset size for materials science research, the ability of algorithms to automatically learn and improve from data becomes increasingly useful. Various types of machine learning algorithms, such as neural networks, have recently been applied to materials research. Among these machine learning algorithms, convolutional neural networks (CNNs) have been very attractive in recent years due to their great success in image recognition.

A CNN may be composed of multilayer neural networks, of which at least one layer employs a mathematical operation called "convolution" to enable the CNN to extract high-level features directly from data. Compared to many other algorithms that specify artificial features based on domain knowledge, a CNN involves relatively little preprocessing, as the features can be directly learned from the data. This is particularly useful when the features are difficult to exactly define. Unlike their long-used basic forms, such as perceptron and fully connected neural networks, CNNs are very recently used for solving solid state problems, such as learning material property prediction, material classification, and material phase transition identification.

Another advantage of neural networks is that they are easy to utilize in transfer learning, which means that a neural network first learns from a large database with inexpensive labels (e.g., first principles calculation results), and then it is fine-tuned on a small dataset where much fewer labeled samples are available (e.g., experimental data). This technique can be used to overcome the data scarcity problem in materials research, and it is applied to property prediction of small molecules and crystalline compounds very recently as a tool for accelerated materials discovery.

The practical realization and sustainable future of emergent technologies is dependent on accelerating materials discovery. Data-driven methods are anticipated to play an increasingly significant role in enabling this desired acceleration. While the vision of accelerating materials discovery using data-driven methods is well-founded, practical realization is throttled due to challenges in data generation, ingestion, and materials state-aware machine learning. High-throughput experiments and automated computational workflows are addressing the challenge of data generation, and capitalizing on these emerging data resources involves ingestion of data into an architecture that captures the complex provenance of experiments and simulations.

In computational materials science, these automated workflows produce large and diverse materials datasets. While these workflows and associated data management tools can be improved to facilitate capturing of a material's state and enable easy capture of reconfigurable analysis methods, their current implementations have facilitated a host of materials discoveries. In practice, machine learning may be used to perform both materials discovery and predict properties of the materials faster than molecular simulations. Machine learning can help identify correlations between material features and target properties. Nevertheless, a solution to the problem of materials property prediction and latent state learning in the case of materials for which certain aspects of state can be assumed as being in a ground state, is desired.

Some aspects of the present disclosure are directed to a machine learning model that uses energy-based modeling (EBM) and latent state learning to predict material properties. As described, EBM is a form of generative modeling that learns an "energy" function by minimizing the "energy" for a target dataset and generates another dataset with a similar distribution as the target dataset. Originally, EBM was inspired by thermodynamics and the "energy" does not have a physical interpretation, but in the present disclosure we bring it back to thermodynamics by interpreting the energy function as the Hamiltonian and the energy as the true physical free energy of a system. As further described, latent state learning, with respect to materials science, is the learning of a state of a material that is not observed, but is inferred from the known parts of the state of the material. Some aspects of the present disclosure rely on energy based modeling and density functional theory data (e.g., electronic/ionic structure data) to find a ground state of a material. In these aspects of the present disclosure, once the ground state is determined, latent state learning is applied to learn and predict a different state (e.g., an oxidation state) of the material.

FIG. 1 illustrates an example implementation of a system-on-chip (SoC) 100, which may include a central processing unit (CPU) 102 or multi-core CPUs, in accordance with certain aspects of the present disclosure, such an artificial intelligence (AI) material state prediction. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a connectivity block 110, which may include fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
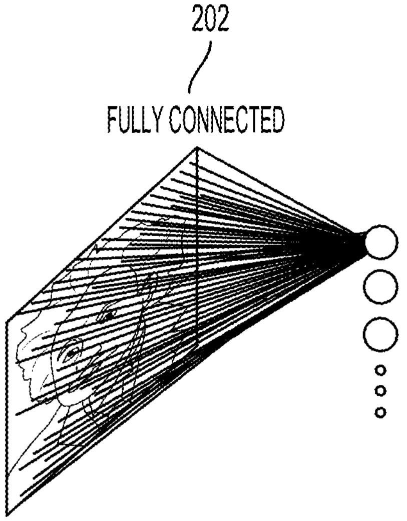
FIGS. 2A, 2B, and 2C are diagrams illustrating a neural network, in accordance with aspects of the present disclosure.
Figure 2B:
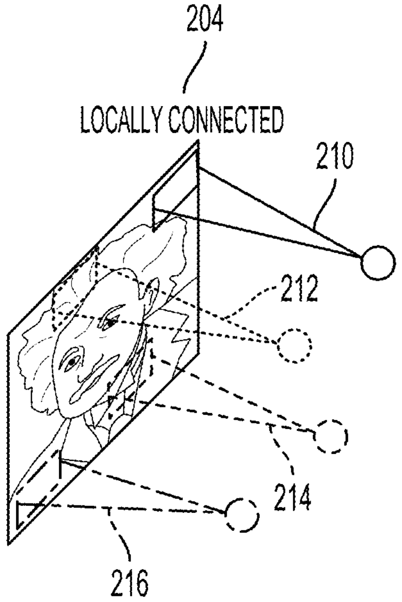
Figure 2C:
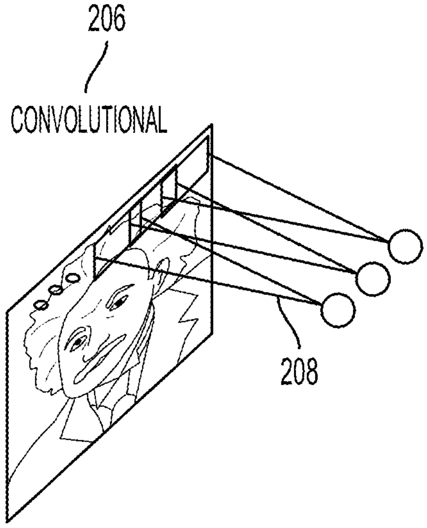

FIGS. 2A, 2B, and 2C are diagrams illustrating a neural network, in accordance with aspects of the present disclosure. The connections between layers of the neural network shown in FIG. 2A-2C may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer.

FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

FIG. 2C illustrates an example of a locally connected neural network is a convolutional neural network. As shown in FIG. 2C, an example of a locally connected neural network is provided as a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
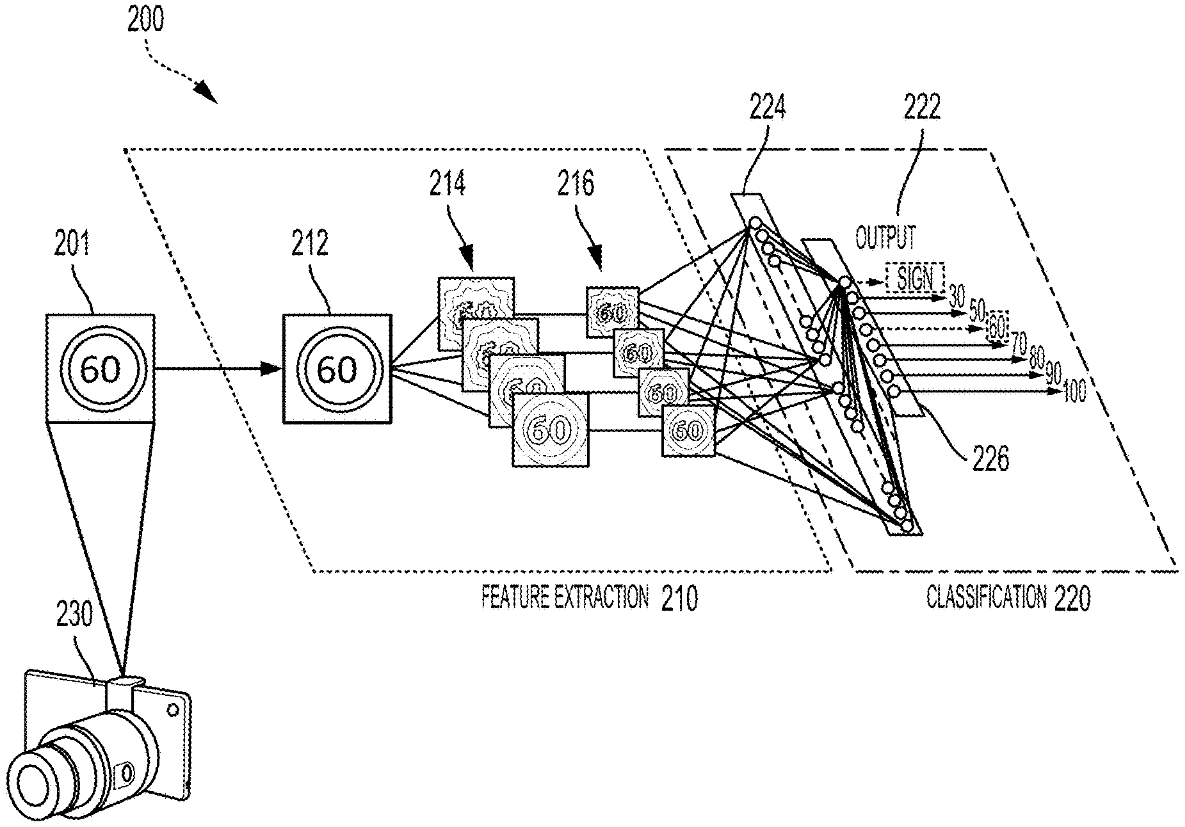
FIG. 2D is a diagram illustrating a neural network, in accordance with aspects of the present disclosure.

FIG. 2D illustrates one type of convolutional neural network, referred to as a deep convolutional network (DCN). In particular, FIG. 2D illustrates a detailed example of a DCN 200 designed to recognize visual features from an image 201, which is provided as an input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights, or predicting states of material sample following processing.

The DCN 200 may be trained with supervised learning. During training, the DCN 200 may be presented with an image, such as the image 201 of a speed limit sign, and a forward pass may then be computed to produce an output 222. The DCN 200 may include a feature extraction section 210 and a classification section 220. Upon receiving the image 201, a convolutional layer 212 may apply convolutional kernels (not shown) to the image 201 to generate a first set of feature maps 214. As an example, the convolutional kernel for the convolutional layer 212 may be a 5×5 kernel that generates 28×28 feature maps. In the present example, because four different convolutional kernels were applied to the image 201 at the convolutional layer 212, four different feature maps are generated in the first set of feature maps 214. The convolutional kernels may also be referred to as filters or convolutional filters.

The first set of feature maps 214 may be subsampled by a max pooling layer (not shown) to generate a second set of feature maps 216. The max pooling layer reduces the size of the first set of feature maps 214. That is, a size of the second set of feature maps 216, such as 14×14, is less than the size of the first set of feature maps 214, such as 28×28. The reduced size provides similar information to a subsequent layer while reducing memory consumption. The second set of feature maps 216 may be further convolved via one or more subsequent convolutional layers (not shown) to generate one or more subsequent sets of feature maps (not shown).

In the example of FIG. 2D, the second set of feature maps 216 is convolved to generate a first feature vector 224. Furthermore, the first feature vector 224 is further convolved to generate a second feature vector 226. Each feature of the second feature vector 226 may include a number that corresponds to a possible feature of the image 201, such as “sign,” “60,” and “100.” A softmax function (not shown) may convert the numbers in the second feature vector 226 to a probability. As such, an output 222 of the DCN 200 is a probability of the image 201 including one or more features.

In the present example, the probabilities in the output 222 for “sign” and “60” are higher than the probabilities of the others of the output 222, such as “30,” “40,” “50,” “70,” “80,” “90,” and “100.” Before training, the output 222 produced by the DCN 200 is likely to be incorrect. Thus, an error may be calculated between the output 222 and a target output. The target output is the ground truth of the image 201 (e.g., “sign” and “60”). The weights of the DCN 200 may then be adjusted so the output 222 of the DCN 200 is more closely aligned with the target output.

As shown in FIGS. 2A-2D, machine learning is concerned with the automatic discovery of patterns in data through the use of computer algorithms. Once discovered, these patterns may be used to perform data classification and/or value prediction. With growing experimental and simulated dataset size for materials science research, the ability of algorithms to automatically learn and improve from data becomes increasingly useful. Various types of machine learning algorithms, such as neural networks, have recently been applied to materials research. Among these machine learning algorithms, convolutional neural networks (CNNs) have been very attractive in recent years due to their great success in image recognition.

The DCN 200 shown in FIG. 2D is composed of multilayer neural networks, of which at least one layer employs a mathematical operation called “convolution” to enable the DCN 200 to extract high-level features directly from data. Compared to many other algorithms that specify artificial features based on domain knowledge, the DCN 200 involves relatively little pre-processing, as the features can be directly learned from the data, such as the image 201. This is particularly useful when the features are difficult to exactly define. Unlike their long-used basic forms, such as perceptron and fully connected neural networks, DCNs are very recently used for solving solid state problems, such as learning material property prediction, material classification, and material phase transition identification.

Another advantage of neural networks is that they are easy to utilize in transfer learning, which means that a neural network first learns from a large database with inexpensive labels (e.g., first principles calculation results), and then it is fine-tuned on a small dataset where much fewer labeled samples are available (e.g., experimental data). This technique can be used to overcome the data scarcity problem in materials research, and it is applied to property prediction of small molecules and crystalline compounds very recently as a tool for accelerated materials discovery.

The practical realization and sustainable future of emergent technologies is dependent on accelerating materials discovery using neural networks. Data-driven methods are anticipated to play an increasingly significant role in enabling this desired acceleration. While the vision of accelerating materials discovery using data-driven methods is well-founded, practical realization is throttled due to challenges in data generation, ingestion, and materials state-aware machine learning. High-throughput experiments and automated computational workflows are addressing the challenge of data generation, and capitalizing on these emerging data resources involves ingestion of data into an architecture that captures the complex provenance of experiments and simulations.

In computational materials science, these automated workflows produce large and diverse materials datasets. While these workflows and associated data management tools can be improved to facilitate capturing of a material’s state and enable easy capture of reconfigurable analysis methods, their current implementations have facilitated a host of materials discoveries. In practice, machine learning may be used to perform both materials discovery and predict properties of the materials faster than molecular simulations. Machine learning can help identify correlations between material features and target properties. Nevertheless, a solution to the problem of materials property prediction and latent state learning in the case of materials for which certain aspects of state can be assumed as being in a ground state, is desired.

Some aspects of the present disclosure are directed to a machine learning model that uses energy-based modeling (EBM) and latent state learning to predict material properties. As described, EBM is a form of generative modeling that learns a lowest “energy” for a target dataset and generates another dataset with a similar distribution as the target dataset. As further described, latent state learning, with respect to materials science, is the learning of a state of a material that is not observed, but is inferred from a known state of the material. Some aspects of the present disclosure rely on energy based modeling and density functional theory data (e.g., electronic/ionic structure data) to find a ground state of a material. In these aspects of the present disclosure, once the ground state is determined, latent state learning is applied to learn and predict a different state (e.g., an oxidation state) of the material, for example, as shown in FIG. 3.

Figure 3:
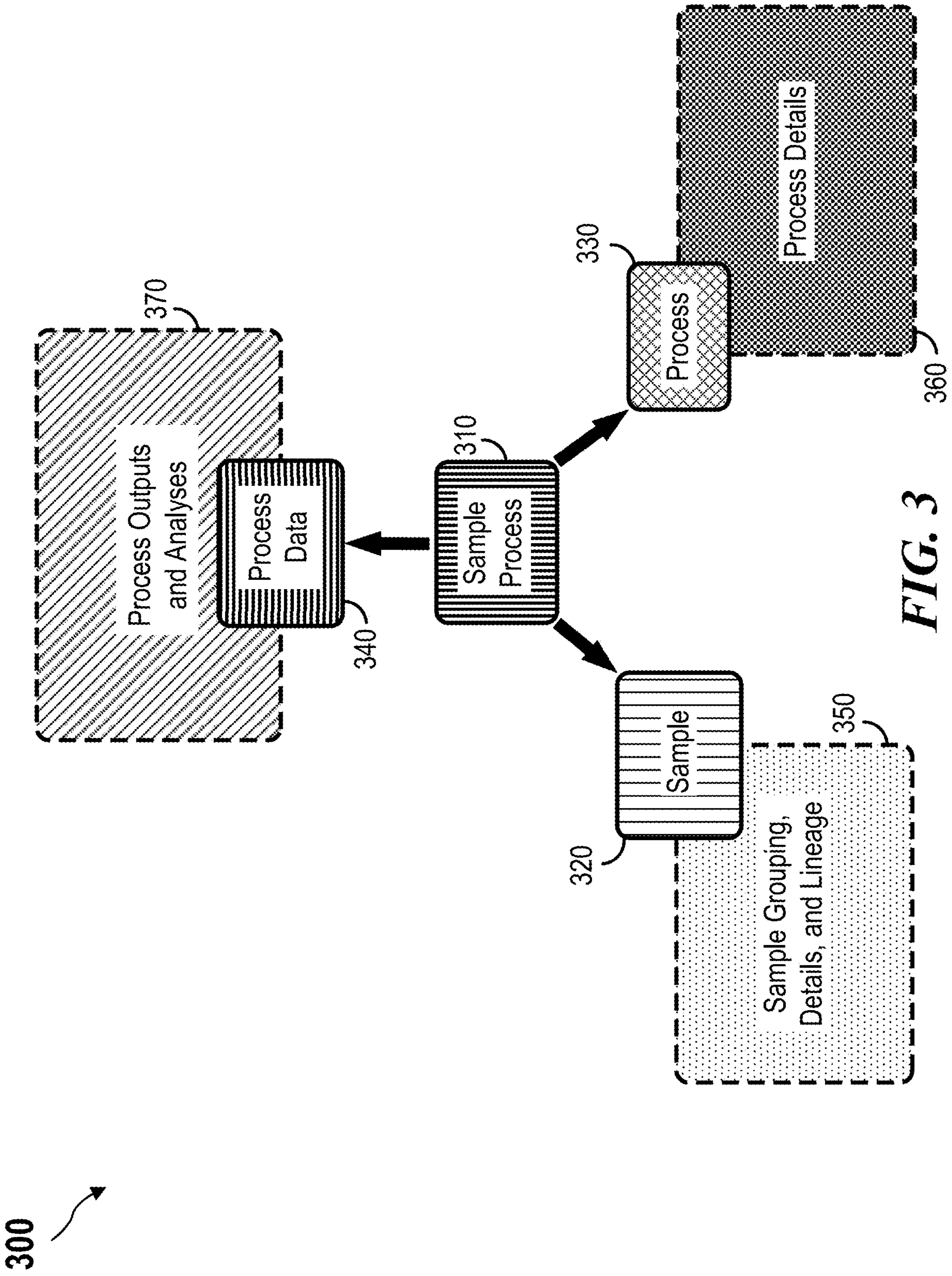
FIG. 3 is a block diagram illustrating an overview of a sample process framework configured to enable energy based modeling for ground state inference, in accordance with aspects of the present disclosure.

FIG. 3 is a block diagram illustrating an overview of a sample process framework 300 configured to enable energy based modeling for ground state inference, according to aspects of the present disclosure. FIG. 3 shows a central location of a sample process entity 310 and a relationship of the sample process entity 310 to the sample process framework 300, in accordance with aspects of the present disclosure. In some aspects of the present disclosure, the sample process framework 300 includes a sample 320, a process 330, and process data 340. The sample process framework 300 may first track the state of samples and instruments involved in a laboratory to completely capture the ground truth. In this example, the focus is mainly on the state of samples, and it is noted that the sample process framework 300 could capture the state of instruments or other research entities.

In some aspects of the present disclosure, the sample process framework 300 enables tracking of a sample provenance by considering three entities: the sample 320, the process 330, and the process data 340. These three entities may be designed to provide intuitive ingestion of data from both traditional manual experiments and their automated or robotic analogues.

In this example, the sample 320 is a label that specifies a physically-identifiable representation of an entity that can undergo many processes (e.g., the liquid in that vial or the thin film on that substrate). An assumption placed on the sample 320 is that the sample 320 has a unique identity for enabling tracking of a lineage and a process history of the sample process entity 310. Another area of the sample process framework 300 is the process 330. As described, the process 330 is an event that occurs to one or more samples.

A further area of the sample process framework 300 is the process data 340. As described, the process data 340 is data generated by a process 330 that applies to one or more of the sample 320 that underwent the process 330.

According to some aspects of the present disclosure, the sample 320, the process 330, and the process data 340 entities are connected via the sample process entity 310 (e.g., a table) to form a central structure of the sample process framework 300. In some aspects of the present disclosure, the sample 320, the process 330, and the process data 340 are tables, having associated secondary tables. In this example, the secondary tables support the central tables of the sample 320, the process 330, and the process data 340. For example, a sample secondary table 350 stores sample details, a process secondary table 360 stores process details, a process data secondary table 370 stores process outputs and analyses.

Figure 4A:
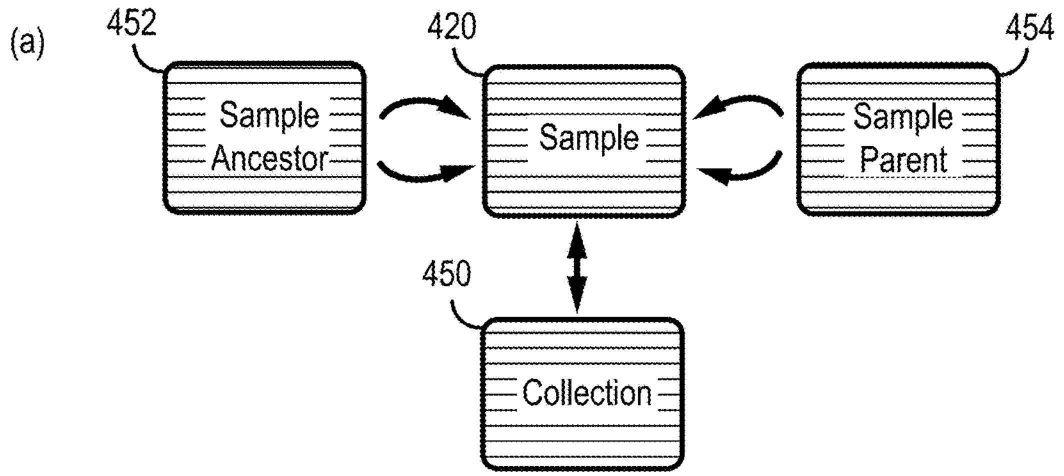
FIGS. 4A-4C are block diagrams further illustrating the sample process framework configured to enable energy based modeling for ground state inference as shown in FIG. 3, according to aspects of the present disclosure.
Figure 4B:
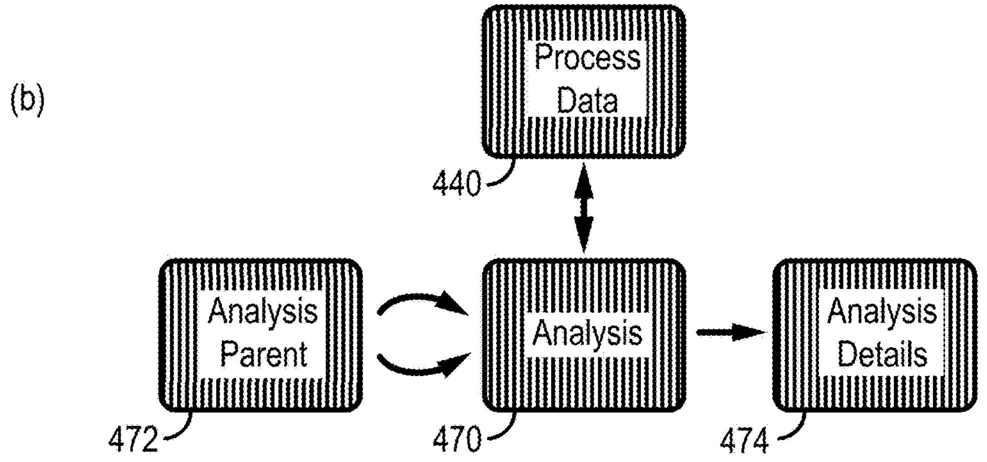
Figure 4C:
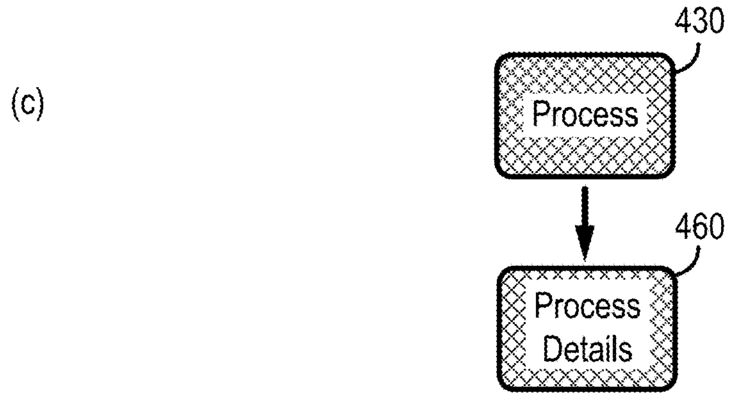

FIGS. 4A-4C are block diagrams further illustrating the sample process framework 300 configured to enable energy based modeling for ground state inference as shown in FIG. 3, according to aspects of the present disclosure. FIG. 4A is a block diagram illustrating potentially-complex lineages of a sample 420 that are tracked through a sample ancestor entity 452 and a sample parent entity 454, based on a collection 450 of the sample 420. Both the sample ancestor entity 452 and the sample parent entity 454 are defined by their connection to two sample entities, indicating a parent/ancestor and child/descendant relationship, respectively. The final entity connected to the sample 420 is the collection 450.

FIG. 4C is a block diagram further illustrating the processes and process details of the process 330 of the sample process framework 300 of FIG. 3, according to aspects of the present disclosure. A process 430 represents one experimental procedure (e.g., a synthesis or characterization) that is applied to a sample (e.g., the sample 420 of FIG. 4A). A more comprehensive discussion on the representation of process details for various relational database management system (RDMS) implementations is provided in FIG. 5.

FIG. 4B is a block diagram further illustrating the process data and analysis of the process data 340 of the sample process framework 300 of FIG. 3, according to aspects of the present disclosure. While the collection 450 of FIG. 4A tracks sample inputs to the process 430 of FIG. 4C, a process data 440 block tracks the output of the process 430. As shown in FIG. 4B, lineage tracking is achieved by using an analysis table 470, an analysis details table 474, and an analysis parent 472. The analysis table 470 may represent a single analytical step and, similar to the process 430, is identified by inputs, outputs, and associated parameters. Just as the collection 450 has a many-to-many relationship with the sample 420, the analysis table 470 has a many-to-many relationship with the process data 440.

Figure 5:
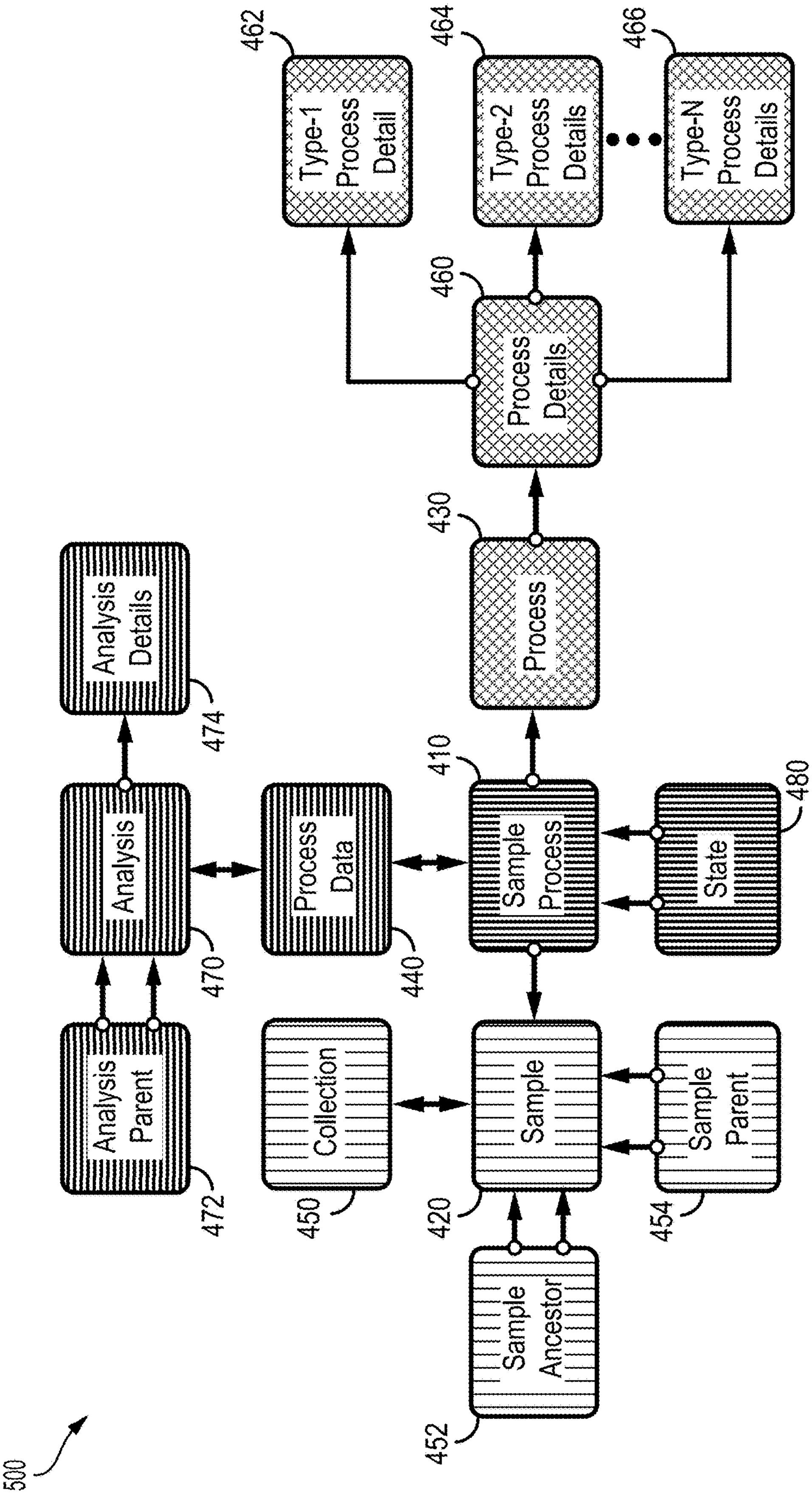
FIG. 5 is a block diagram illustrating a full graphical representation of a sample process framework configured to enable energy based modeling for ground state inference, according to aspects of the present disclosure.

FIG. 5 is a block diagram illustrating a full graphical representation of a sample process framework 500 configured to enable energy based modeling for ground state inference, according to aspects of the present disclosure. The sample process framework 500 provides a complete illustration of the sample process framework 300 of FIG. 3, including the three major areas of the sample process framework 300 shown in FIGS. 4A-4C, according to aspects of the present disclosure. In some aspects of the present disclosure, single-headed arrows between the blocks of the sample process framework 500 indicate a many-to-one relationship in the direction of the arrow. In addition, double-headed arrows indicate a many-to-many relationship. In some aspects of the present disclosure, a database implementation of the sample process framework 500 is defined using standard entity relationship language. In one implementation, the sample process framework 500 is instantiated in a relational database management system (RDMS), but is not tied to a specific implementation.

In this example, the sample process framework 500 expands on the process 430 and the process details entity 460 blocks shown in FIG. 4C as the process 330 of the sample process framework 300 of FIG. 3. As shown, the process details entity 460 is expanded to illustrate process type details, such as a type-1 process details 462, a type-2 process details 464, and a type-N process details 466. In addition, the sample process framework 500 adds a state 480 to the sample process 410. As shown in the sample process framework 500, the state 480 is defined by two entities of the sample process 410 that share the sample 420 and do not have an entity of the sample process 410 chronologically between the two entities of the sample process 410.

In computational materials science, the sample process framework 500 produces large and diverse materials datasets. While these workflows and associated data management tools can be improved to facilitate capturing of a material's state and enable easy capture of reconfigurable analysis methods, their current implementations have facilitated a host of materials discoveries. In practice, machine learning may be used to perform both materials discovery and predict properties of the materials faster than molecular simulations. Machine learning can help identify correlations between material features and target properties. Nevertheless, a solution to the problem of materials property prediction and latent state learning in the case of materials for which certain aspects of state can be assumed as being in a ground state, is desired.

Some aspects of the present disclosure are directed to a machine learning model that uses energy-based modeling (EBM) and latent state learning to predict material properties. As described, EBM is a form of generative modeling that learns a lowest "energy" for a target dataset and generates another dataset with a similar distribution as the target dataset. As further described, latent state learning, with respect to materials science, is the learning of a state of a material that is not observed, but is inferred from a known state of the material. Some aspects of the present disclosure rely on energy based modeling and density functional theory data (e.g., electronic/ionic structure data) to find a ground state of a material. In these aspects of the present disclosure, once the ground state is determined, latent state learning is applied to learn and predict a different state (e.g., an oxidation state) of the material. This process is further illustrated, for example, according to a method as shown in FIG. 6.

Figure 6:
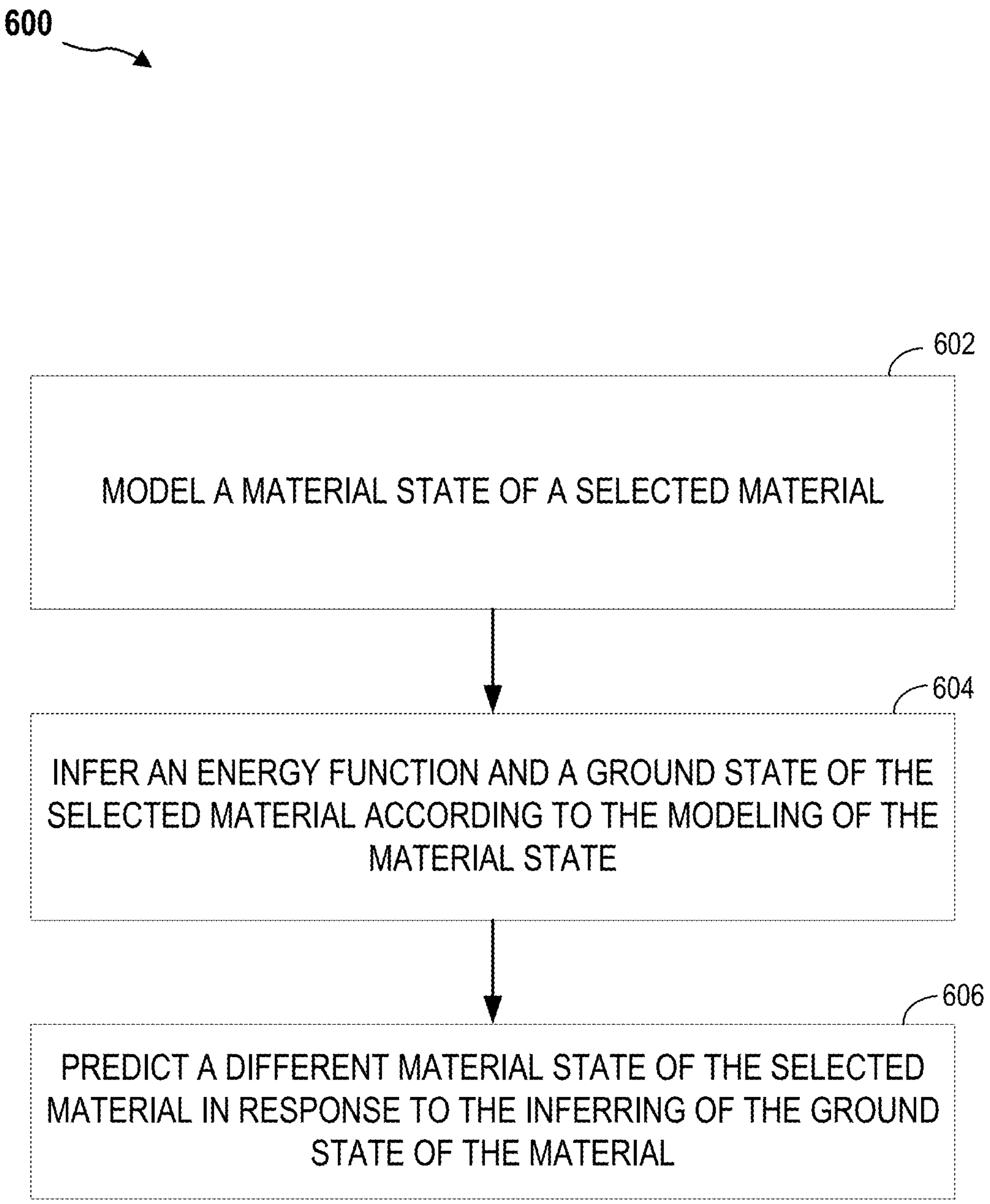
FIG. 6 is a flow diagram illustrating a method for ground state inference, according to aspects of the present disclosure.

FIG. 6 is a flow diagram illustrating a method for ground state inference, according to aspects of the present disclosure. A method 600 begins at block 602, in which a material state of a selected material is modeled. For example, FIG. 5 shows the sample process framework 500 configured to enable energy based modeling for ground state inference. The sample process framework 500 may model the state 480 of the sample 420 using the DCN 200 shown in FIG. 2D. In some aspects of the present disclosure, the DCN 200 is trained to model the material state of the selected material by performing energy based modeling of the material state. For example, this energy based modeling of the material state learns a lowest "energy" for a target dataset and generates another dataset with a similar distribution as the target dataset.

At block 604, an energy function and a ground state of the selected material is inferred according to the modeling of the material state. For example, as shown in the sample process framework 500 of FIG. 5, the state 480 is inferred as being in a ground state according to the modeling of the material state using the DCN 200. The DCN 200 may infer the ground state by estimating density functional theory (DFT) data regarding the material state. The DCN 200 may infer the ground state by predicting the ground state of the material according to the estimated DFT data. For example, the ground state may be an electronic ground state or an ionic ground state. Some aspects of the present disclosure bring energy back to thermodynamics by interpreting the energy function as a Hamiltonian and the energy as the true physical free energy of a system.

At block 606, a different material state of the selected material is predicted in response to the inferring of the ground state of the material. For example, as shown in FIG. 2D, the DCN 200 is trained to predict the different material state by estimating the different state of the material using latent state learning. In some aspects of the present disclosure, the DCN 200 is trained to perform latent state learning, in which the DCN 200 is trained to learn of the different material state of the select material that is not observed, but is inferred from a known state of the material.

Some aspects of the present disclosure rely on energy based modeling and density functional theory data (e.g., electronic/ionic structure data) to find a ground state of a material. In these aspects of the present disclosure, once the ground state is determined, latent state learning is applied using the DCN 200 to learn and predict a different state (e.g., an oxidation state) of the material. Utilizing this information that is at an energy minimum, the DCN 200 is trained to use a latent state. Any latent state that is learned may be concrete (e.g., oxidation state) for which constraints like charge balance can be enforced or it can be completely abstract. The training procedure of the model provided by the DCN 200 can be implemented as alternating gradient descent between the loss function and the energy function (where we minimize the energy), or in the case of Gaussian Process regression, as partial derivatives observations.

In some aspects, the method 600 may be performed by the SoC 100 (FIG. 1). That is, each of the elements of the method 600 may, for example, but without limitation, be performed by the SoC 100 or one or more processors (e.g., CPU 102 and/or NPU 108) and/or other components included therein.

The system for accelerating machine learning includes means for dynamically routing inference between the sub-neural networks of a neural network acceleration architecture. In one aspect, the routing means may be the switch device 302 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a non-transitory computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for ground state inference, comprising:

modeling a material state of a selected material utilizing an energy based (EB) deep convolutional neural network (DCNN) (EB DCNN) model, the EB DCNN model comprising a feature extraction section and a classification section, the feature extraction section configured to apply convolutional kernels to generate feature maps, the EB DCNN model trained with supervised learning by computing a forward pass to produce an output;

inferring, by the EB DCNN model, an energy function and a ground state of the selected material according to the modeling of the material state; and predicting, by the EB DCNN model, a different, unobserved material state of the selected material by estimating the different, unobserved material state using latent state learning in response to the inferring of the ground state of the material.

2. The method of claim 1, in which modeling comprises performing energy based modeling of the material state.

3. The method of claim 1, in which inferring the energy function and the ground state comprises:

estimating density functional theory (DFT) data regarding the material state;

predicting the ground state of the material according to the estimated DFT data; and interpreting the energy function as a Hamiltonian.

4. The method of claim 1, in which the ground state comprises an electronic ground state.

5. The method of claim 1, in which the ground state comprises an ionic ground state.

6. The method of claim 1, in which the different state comprises an oxidation state.

7. The method of claim 1, further comprising training a deep convolutional network to infer the different material state based on the ground state of the material through state learning.

8. A non-transitory computer-readable medium having program code recorded thereon for ground state inference, the program code being executed by a processor and comprising:

program code to model a material state of a selected material utilizing an energy based (EB), deep convolutional neural network (DCNN) (EB DCNN) model, the EB DCNN model comprising a feature extraction section and a classification section, the feature extraction section configured to apply convolutional kernels to generate feature maps, the EB DCNN model trained with supervised learning by computing a forward pass to produce an output;

program code to infer, by the EB DCNN model, an energy function and a ground state of the selected material according to the modeling of the material state; and program code to predict, by the EB DCNN model, a different, unobserved material state of the selected material by estimating the different, unobserved material state using latent state learning in response to the inferring of the ground state of the material.

9. The non-transitory computer-readable medium of claim 8, in which the program code to model comprises program code to perform energy based modeling of the material state.

10. The non-transitory computer-readable medium of claim 8, in which the program code to infer the energy function and the ground state comprises:

program code to estimate density functional theory (DFT) data regarding the material state;

program code to predict the ground state of the material according to the estimated DFT data; and program code to interpret the energy function as a Hamiltonian.

11. The non-transitory computer-readable medium of claim 8, in which the ground state comprises an electronic ground state.

12. The non-transitory computer-readable medium of claim 8, in which the ground state comprises an ionic ground state.

13. The non-transitory computer-readable medium of claim 8, in which the different state comprises an oxidation state.

14. The non-transitory computer-readable medium of claim 8, further comprising program code to train a deep convolutional network to infer the different material state based on the ground state of the material through state learning.

15. A system for ground state inference, the system comprising:

a memory; and at least one processor coupled to the memory and configured to execute an energy based (EB), deep convolutional neural network (DCNN) (EB DCNN) model to model a material state of a selected material, the EB DCNN model comprising a feature extraction section and a classification section, the feature extraction section configured to apply convolutional kernels to generate feature maps, the EB DCNN model trained with supervised learning by computing a forward pass to produce an output, the EB DCNN model to infer an energy function and a ground state of the selected material according to the modeling of the material state, and to predict, the EB DCNN model, a different, unobserved material state of the selected material by estimating the different, unobserved material state using latent state learning in response to the inferring of the ground state of the material.

16. The system of claim 15, in which the ground state comprises an electronic ground state and/or an ionic ground state, and the different state comprises an oxidation state.

17. The system of claim 15, further comprising a deep convolutional network trained to infer the different material state based on the ground state of the material through state learning.

* * * * *